(12) United States Patent
Wang et al.

(10) Patent No.: US 9,923,831 B2
(45) Date of Patent: Mar. 20, 2018

(54) PACKET PRIORITIZATION IN A SOFTWARE-DEFINED NETWORK IMPLEMENTING OPENFLOW

(71) Applicant: Futurewei Technologies, Inc., Plano, TX (US)

(72) Inventors: Jiao Wang, Shenzhen (CN); Min Luo, Cumming, GA (US)

(73) Assignee: Futurewei Technologies, Inc., Plano, TX (US)

( * ) Notice: Subject to any disclaimer, the term of this patent is extended or adjusted under 35 U.S.C. 154(b) by 252 days.

(21) Appl. No.: 14/089,295

(22) Filed: Nov. 25, 2013

(65) Prior Publication Data

US 2014/0146674 A1 May 29, 2014

Related U.S. Application Data

(60) Provisional application No. 61/731,389, filed on Nov. 29, 2012.

(51) Int. Cl.
*H04L 12/851* (2013.01)
*H04L 12/721* (2013.01)
(Continued)

(52) U.S. Cl.
CPC ......... *H04L 47/2433* (2013.01); *H04L 45/38* (2013.01); *H04L 45/54* (2013.01); *H04L 45/64* (2013.01); *H04L 45/745* (2013.01)

(58) Field of Classification Search
CPC . H04L 47/2433; H04L 45/745; H04L 12/851; H04L 12/741; H04L 45/7457; H04L 12/28
See application file for complete search history.

(56) References Cited

U.S. PATENT DOCUMENTS

2005/0226242 A1* 10/2005 Parker .................... H04L 12/56
370/389
2006/0041668 A1* 2/2006 Dinger ............... H04L 12/2602
709/229
(Continued)

FOREIGN PATENT DOCUMENTS

CN 101789995 A 7/2010
CN 102685006 A 9/2012
(Continued)

OTHER PUBLICATIONS

Partial English Translation and Abstract of Chinese Patent Application No. CN101789995A, dated May 9, 2014, 3 pages.
(Continued)

*Primary Examiner* — Anez Ebrahim
(74) *Attorney, Agent, or Firm* — Conley Rose, P.C.

(57) ABSTRACT

A software-defined networking (SDN) OpenFlow apparatus comprises a processor, and a memory system coupled to the processor and comprising a flow pipeline, wherein the flow pipeline comprises a series of flow tables, wherein each of the flow tables comprises at least one match field, wherein the match fields correspond to a plurality of network services, wherein the match fields are ordered based on a prioritization of the network services, which of the match fields are shared among the network services, a shared dependency of the match fields, and processing speed, and wherein the prioritization is based on which network services are most important and which network services are most frequently used.

18 Claims, 10 Drawing Sheets

(51) Int. Cl.
*H04L 12/741* (2013.01)
*H04L 12/715* (2013.01)

(56) References Cited

U.S. PATENT DOCUMENTS

| | | | | |
|---|---|---|---|---|
| 2009/0323524 A1* | 12/2009 | Kuhn | ................. | H04L 43/0894 370/230 |
| 2013/0170495 A1* | 7/2013 | Suzuki | ................ | H04L 49/3009 370/392 |
| 2014/0067997 A1* | 3/2014 | Saabas | .................... | H04L 47/22 709/217 |

FOREIGN PATENT DOCUMENTS

| EP | 2615781 A1 | 7/2013 |
|---|---|---|
| WO | 2012032864 A1 | 3/2012 |
| WO | 2012032864 A1 | 3/2013 |

OTHER PUBLICATIONS

Foreign Communication From a Counterpart Application, PCT Application No. PCT/CN2013/088108, International Search Report dated Feb. 27, 2014, 6 pages.
Foreign Communication From a Counterpart Application, PCT Application No. PCT/CN2013/088108, Written Opinion dated Feb. 27, 2014, 4 pages.
"OpenFlow Switch Specification," Version 1.0.0, Wire Protocol 0x01, Dec. 31, 2009, 42 page.
"OpenFlow Switched Specification" Version 1.1.0 Implemented, Wire Protocol 0x02, Feb. 28, 2011, 56 pages.
"OpenFlow Switched Specification" Version 1.3.1, Wire Protocol 0x04, Sep. 6, 2012, 128 pages.
Foreign Communication From a Counterpart Application, European Application No. 13857704.4, Extended European Search Report dated Oct. 8, 2015, 9 pages.

* cited by examiner

PACKET PRIORITIZATION IN A SOFTWARE-DEFINED NETWORK IMPLEMENTING OPENFLOW

CROSS-REFERENCE TO RELATED APPLICATIONS

This application claims priority to U.S. Provisional Application No. 61/731,389 filed Nov. 29, 2012 by Jiao Wang, et al., and titled "A Mechanism for Multiflow Table Design and Implementation Under SDN-OpenFlow," which is incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication networks comprise nodes, such as routers, switches, bridges, and other devices, that transport data through the networks. Over the years, the networks have become increasingly complex, leading to interwoven webs of network nodes. As a result, node vendors have struggled to customize, optimize, and improve the performance of the nodes. Software-defined networking (SDN) is an emerging network technology that addresses such customization, optimization, and improvement. SDN simplifies networks by decoupling a data-forwarding (i.e., data plane) functionality from a routing, resource, and other management (i.e., control plane) functionality. As a result, while traditional network nodes may provide both the data plane functionality and the control plane functionality, an SDN node may provide the data plane functionality and an SDN controller may provide the control plane functionality. Open application programming interface (API) services, such as OpenFlow, may standardize the interactions between the data plane and the control plane and may allow for the implementation of nodes and controllers that are not specific to any vendor. As a result, SDN in conjunction with an open API service like OpenFlow may provide benefits such as improved customization, optimization, and performance.

SUMMARY

In one embodiment, the disclosure includes a software-defined networking (SDN) OpenFlow apparatus comprising a processor, and a memory system coupled to the processor and comprising a flow pipeline, wherein the flow pipeline comprises a series of flow tables, wherein each of the flow tables comprises at least one match field, wherein the match fields correspond to a plurality of network services, wherein the match fields are ordered based on a prioritization of the network services, which of the match fields are shared among the network services, a shared dependency of the match fields, and processing speed, and wherein the prioritization is based on which network services are most important and which network services are most frequently used.

In another embodiment, the disclosure includes a software-defined networking (SDN) OpenFlow apparatus comprising a processor, and a memory system coupled to the processor and comprising a flow pipeline, wherein the flow pipeline comprises a series of flow tables numbered 0 to 11, wherein flow table 0 and flow table 1 are configured to implement an access control list (ACL) service, wherein flow table 2 is configured to implement a service locating service, wherein flow table 3 is configured to implement a layer two forwarding service, wherein flow table 2, flow table 3, and flow table 4 are configured to implement a virtual local area network (VLAN) service, wherein flow table 2 and flow table 5 are configured to implement a multiprotocol label switching (MPLS) service, wherein flow table 2, flow table 6, flow table 7, and flow table 8 are configured to implement an Internet Protocol version 4 (IPv4) service, wherein flow table 2, flow table 6, flow table 9, and flow table 10 are configured to implement an Internet Protocol version 6 (IPv6) service, and wherein flow table 11 is configured to implement at least one additional service.

In yet another embodiment, the disclosure includes a method related to software-defined networking (SDN) OpenFlow, the method comprising selecting a plurality of network services, prioritizing the network services based on which network services are most important and which network services are most frequently used, determining a match field corresponding to each of the network services, and designing a flow pipeline with a series of flow tables, wherein each of the flow tables comprises at least one of the match fields, and wherein the match fields are ordered based on the prioritizing, which of the match fields are shared among the network services, a shared dependency of the match fields, and processing speed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
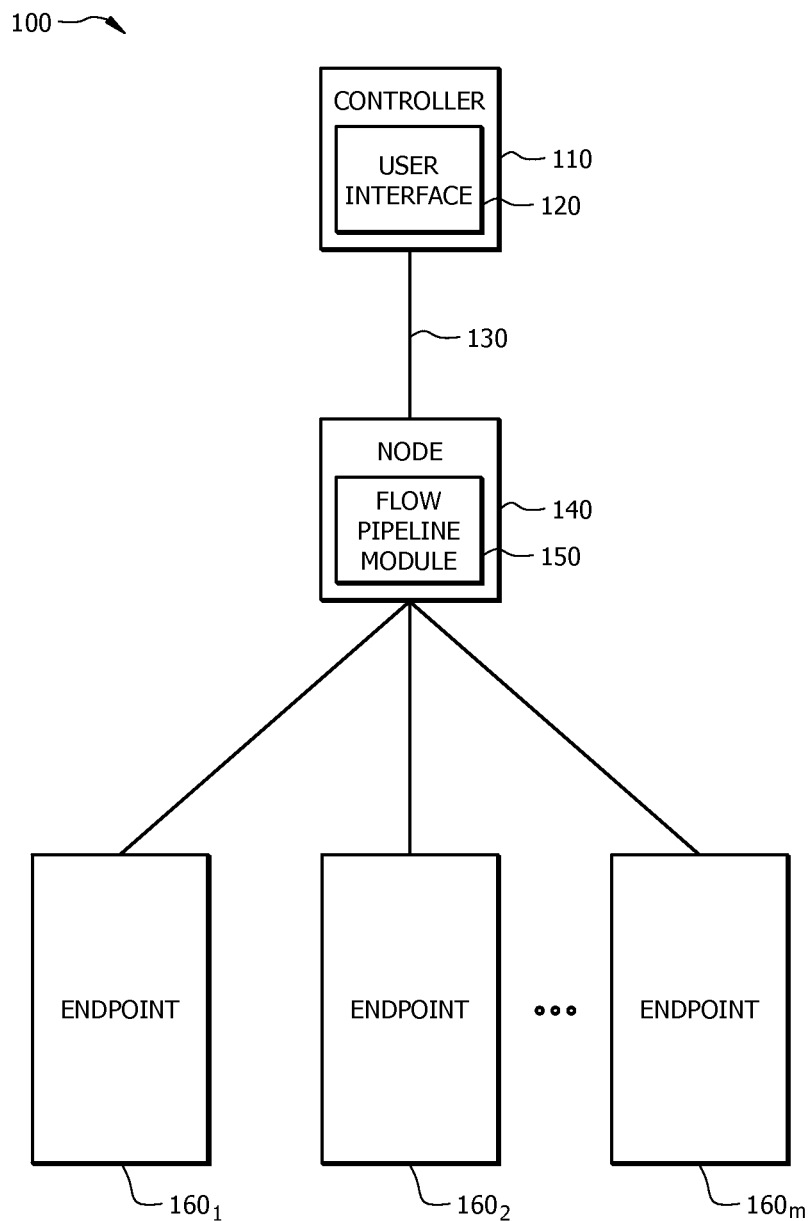
FIG. 1 is a schematic diagram of a software-defined network according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Networks may have nodes with routing tables. A routing table may comprise routing instructions that instruct a node how to route data to network destinations. Traditional Internet Protocol (IP)-based network nodes may have relatively large routing tables comprising many, possibly millions of, routing instructions. The routing instructions may each have, for example, five attributes. The data delivery rate of such nodes may therefore be relatively slower because the data delivery rate may closely depend on the speed of searching through the large routing tables. In addition, such routing tables may be implemented on ternary content-addressable memory (TCAM), and TCAM may consume relatively more power, cost, and space compared to other forms of memory.

OpenFlow Switch Specification, Version 1.0.0 (OpenFlow 1.0.0) adopted a single routing, or flow, table and therefore inherited the issues described above. A flow table may be defined as a routing table used to perform data packet flow. Packet flow may comprise packet lookup, forwarding, and modification. A packet may be defined as an Ethernet, IP, or other data structure comprising a header and a payload. In addition, OpenFlow 1.0.0 provided for 12-tuple, or 12-element, flow entries. Flow entries may comprise data to compare a packet to, as well as instructions to process the packet based on the outcome of the comparison. Implementation may therefore require duplication of many attributes across the five-tuple entries, thus exhausting flow table space and hardware resources. Furthermore, OpenFlow 1.0.0 may require a complex hardware abstraction layer (HAL) to implement. An HAL may be defined as an abstraction layer meant to allow software to fully function with different types of hardware. Consequently, while OpenFlow 1.0.0 controllers may provide routing instructions to nodes in a centralized fashion, those routing instructions may still be inefficient. Finally, OpenFlow 1.0.0 may not take advantage of the ability to recognize application or flow types or take advantage of other potential in an SDN-OpenFlow network.

In place of nodes having a single flow table, OpenFlow Switch Specification, Version 1.1.0 (OpenFlow 1.1.0), which is incorporated by reference as if reproduced in its entirety, introduces nodes having flow pipelines with multiple flow tables. Each flow table comprises flow entries, which comprise match fields. A flow pipeline may be defined as a set of linked flow tables. A match field may be defined as a field against which a packet is matched. The introduction of flow pipelines, however, may make node design and implementation more complex. For example, it may be difficult to separate network services like QoS and routing. Also, there is a challenge in designing flow pipelines that effectively use resources like random access memory (RAM) and TCAM and that are flexible, easy to implement, and able to quickly search for matches. To facilitate OpenFlow's adoption for large networks, there is also a need to extend the core table abstraction and establish flexible, yet optimized, flow pipelines with multiple flow tables that effectively provide the following: (1) core Internet routing with QoS policies; (2) routing driven by application types or flow characteristics; (3) routing using current hardware, but relatively smaller TCAM tables; and (4) layer two and layer three switching capabilities. Layer two may refer to the data link layer in the Open Systems Interconnection (OSI) model. Layer three may refer to the network layer in the OSI model. Since OpenFlow 1.1.0, subsequent OpenFlow specifications have been implemented. OpenFlow Switch Specification, Version 1.3.1 (OpenFlow 1.3.1), which is incorporated by reference as if reproduced in its entirety, is the most recent OpenFlow specification. It should be understood that, while OpenFlow 1.3.1 is the most recent OpenFlow specification, the disclosed technique is not limited to OpenFlow 1.3.1.

Disclosed herein are systems and methods for an improved flow pipeline design in SDN OpenFlow-based switches and similar devices. Generally, the disclosed technique may focus on key network services, prioritize those key network services, and select for the flow tables a sequence of match fields that may be needed to provide those key network services. More specifically, the disclosed technique may focus on optimizing the processing (searching and matching for match fields) time for important and frequently-used services such as access control list (ACL), layer two forwarding, virtual local area network (VLAN), MPLS, and layer three forwarding network. In addition, the disclosed technique may provide additional match fields for locating different service types in order to accelerate forwarding. A final flow table may be used to include match fields related to yet other services. The disclosed technique may therefore provide SDN OpenFlow-based routing with QoS policies; routing driven by application types or flow characteristics; routing using current hardware, but relatively smaller TCAM tables; and layer two and layer three switching capabilities.

FIG. 1 is a schematic diagram of a software-defined network 100 according to an embodiment of the disclosure. The network 100 may comprise a controller 110, a channel 130, a node 140, and a plurality of m endpoints 160.

The controller 110 may be any communication device or process capable of communication with the node 140. For example, the controller 110 may be a computer server capable of receiving instructions from a user via a user interface 120 and relaying those instructions to the node 140. The controller 110 may manage the node 140 via OpenFlow.

The channel 130 may be any channel capable of providing a communication path between the controller 110 and the node 140. For example, the channel 130 may be a physical medium or a logical connection. The channel 130 may be a secure channel and may use OpenFlow to facilitate communication between the controller 110 and the node 140.

The node 140 may be any communication device capable of communication with the controller 110 and among the endpoints 160. For example, the node 640 may be a router, a switch, a bridge, or another similar device. The node 140 may receive packets from one endpoint 160 and route those packets to another endpoint 160 based on instructions received from the controller 110 and implemented on a flow pipeline module (FPM) 150, which is described more fully below.

The endpoints 160 may be any communication devices capable of communication with the node 140 and with each other. For example, the endpoints 160 may be a mobile phone, a tablet computer, a desktop computer, a notebook computer, or another similar device.

Figure 2:
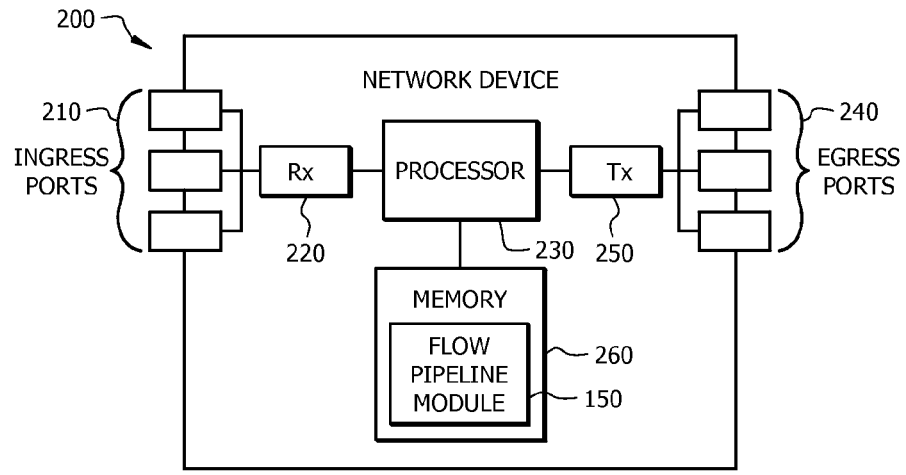
FIG. 2 is a schematic diagram of a network device according to an embodiment of the disclosure.

FIG. 2 is a schematic diagram of a network device 200 according to an embodiment of the disclosure. The network device 200 may comprise a plurality of ingress ports 210 and/or receiver units (Rx) 220 for receiving data, a processor or logic unit 230 to process signals, a plurality of egress ports 240 and/or transmitter units (Tx) 250 for transmitting data to other components, and a memory 260. The network device 200 may be suitable for implementing the features, methods, and devices described herein, including the node 140. For example, if the network device 200 is implementing the node 140, then the ingress ports 210 and the egress ports 240 may be coupled to the channel 130 and the endpoints 160. In addition, the processor 230 and/or the memory 260 may comprise the FPM 150.

The processor 230, which may be referred to as a central processing unit (CPU), may be in communication with the ingress ports 210, receiver units 220, egress ports 240, transmitter units 250, and memory 260. The processor 230 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs.

The memory 260 may be comprised of one or more disks, tape drives, or solid-state drives; may be used for non-volatile storage of data and as an over-flow data storage device; may be used to store programs when such programs are selected for execution; and may be used to store instructions and perhaps data that are read during program execution. The memory 260 may be volatile and/or non-volatile and may be read only memory (ROM), RAM, TCAM, static random-access memory (SRAM), or any combination thereof. The memory 260 may be located on a chip with the other components of the network device 200 or located on a separate chip.

Figure 3:
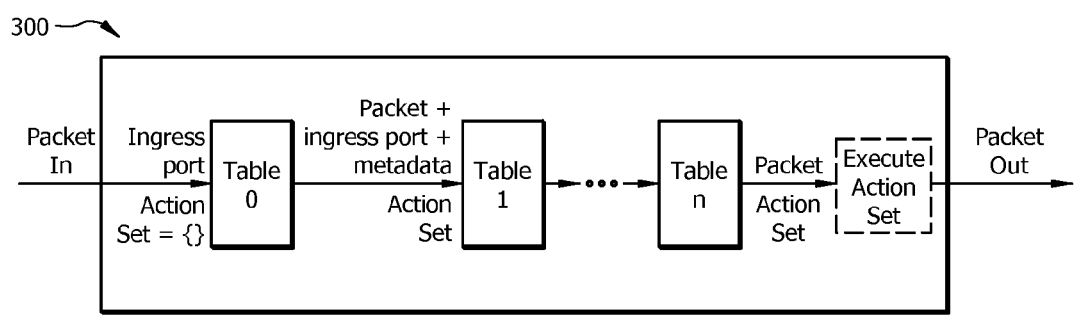
FIG. 3 is a schematic diagram of a generalized flow pipeline.

FIG. 3 is a schematic diagram of a generalized flow pipeline 300. The flow pipeline 300 is from OpenFlow 1.3.1. The flow pipeline 300 may be implemented in the node 140 and, in particular, the FPM 150. The flow pipeline 300 may comprise flow tables numbered 0 to n, where n is an integer of one or higher. Each table may comprise any number of flow entries. The controller 110 may add, update, and delete those flow entries at any time. The flow entries may comprise six attributes: match fields, a priority, counters, instructions, timeouts, and a cookie. Match fields are defined above. Priority may define a matching precedence of a flow entry. Counters may update when packets are matched. Instructions inform the flow pipeline 300 of how to process a packet if a match occurs. Timeouts may refer to the maximum amount of time a packet may be routed through the flow pipeline 300 before expiring. A cookie may not be used for processing packets, but may be used to filter flow statistics and for modification and deletion. The disclosed technique may focus on flow entry match fields, counters, and instructions.

A packet may enter the flow pipeline 300 via an ingress port. The ingress port and any subsequent ports may be physical or logical ports. Packet flow may be unidirectional so that a packet progresses sequentially from table 0 to table n. The packet may always start at table 0. At table 0, the FPM 150 may extract a packet header from the packet and compare a value from the header to each match field in each flow entry of table 0. The comparison may have one of three outcomes: the value matches one match field, the value matches more than one match field, or the value does not match any match field. If the value matches one match field, then the FPM 150 may update a counter of that match field, execute instructions associated with that match field, and forward the packet according to those instructions. For example, the FPM 150 may forward the packet to table 1. If the value matches more than one match field, then the FPM 150 may determine which match field has the highest priority for table 0, update a counter of the highest-priority match field, execute instructions associated with that match field, and forward the packet according to those instructions. For example, the FPM 150 may forward the packet to table 1. If the value does not match any match field, then the FPM 150 may send the packet to the controller 110, drop the packet, or forward the packet according to a table-miss instruction.

The instructions may instruct changes to the packet, an action set associated with the packet, metadata associated with the packet, or any combination thereof. The changes to the packet may be to the data included in the packet itself. The action set may be defined as the set of processing actions applied to a packet upon exiting the flow pipeline 300. Metadata may be defined as maskable register values used to carry information from one table to the next table. In order to achieve a match, the value from the header must be exactly the same as the match field. Alternatively, a flow entry may comprise a wildcard match field, meaning that the value from the header may match the match field if the value from the header is any value. In addition to matching packet headers, the FPM 150 may match against ingress ports, egress ports, and metadata fields. The matching process may repeat at each table until the packet exits table n and executes the finalized action set or until the packet is dropped or sent to the controller 110 due to a non-match.

Figure 4:
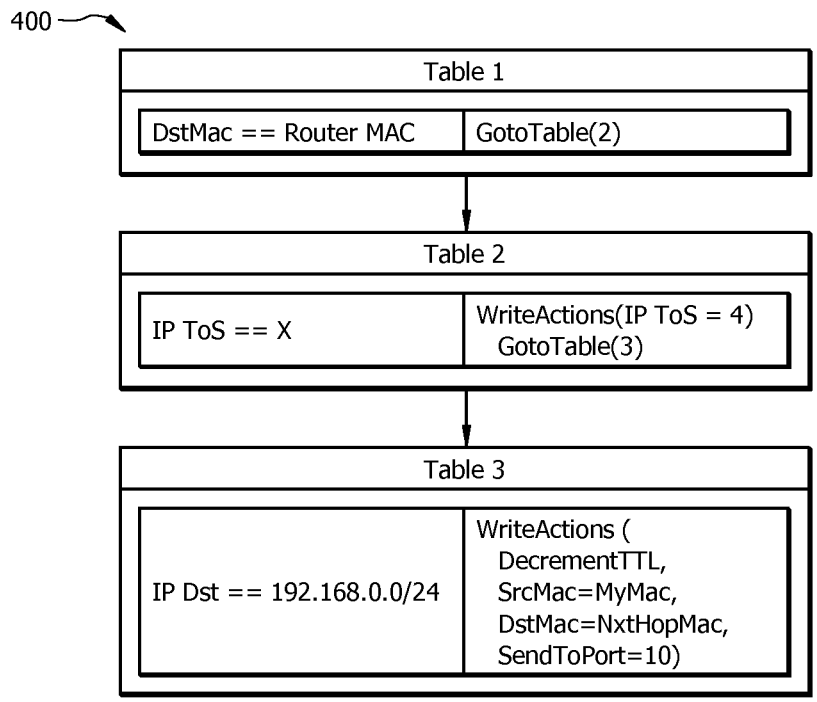
FIG. 4 is a schematic diagram of an embodiment of a flow pipeline for implementing quality of service (QoS).
Figure 5:
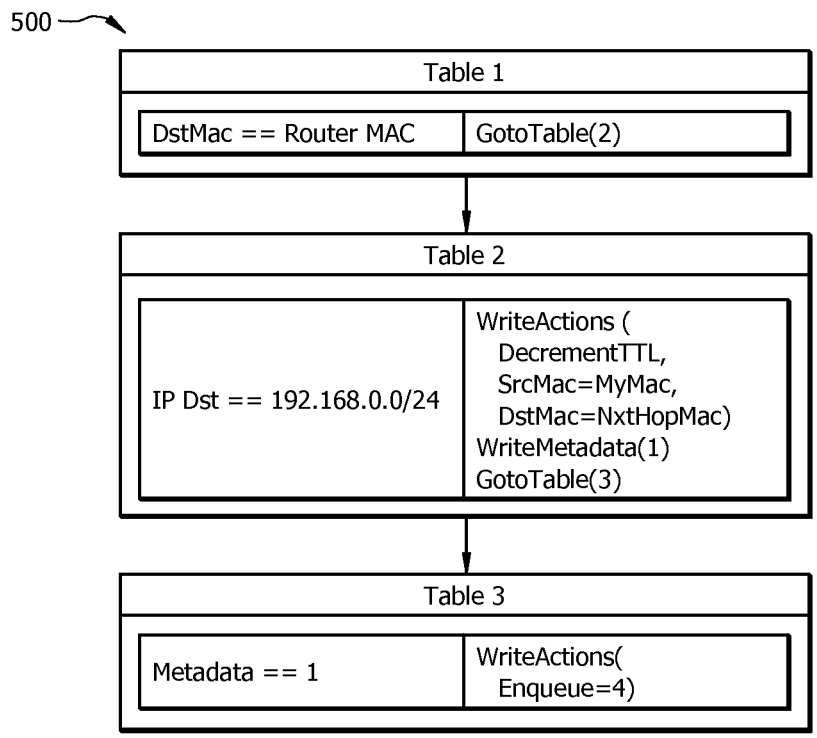
FIG. 5 is a schematic diagram of an embodiment of a flow pipeline for implementing QoS.
Figure 6:
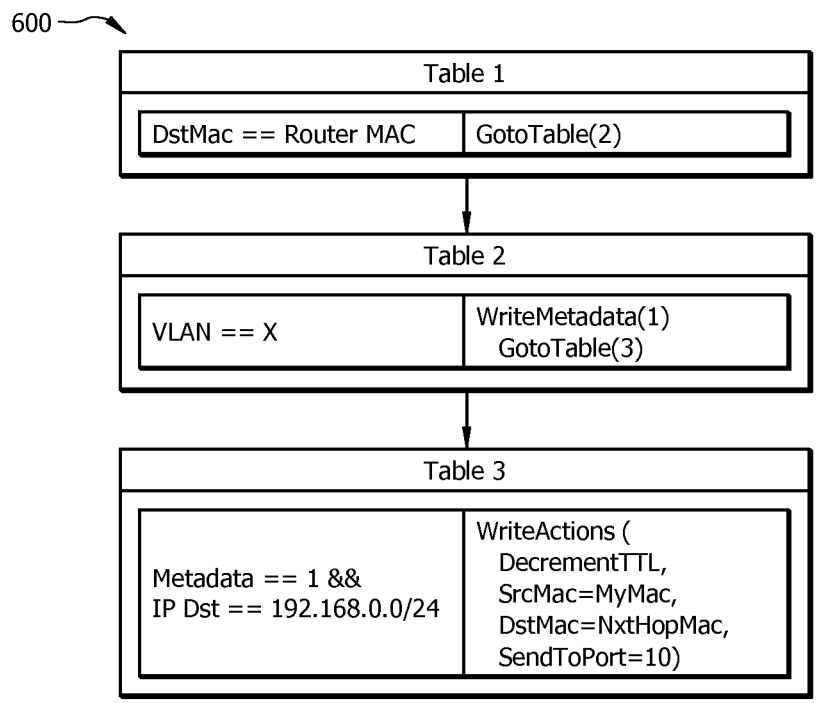
FIG. 6 is a schematic diagram of an embodiment of a flow pipeline for implementing virtual routing and forwarding (VRF).
Figure 7:
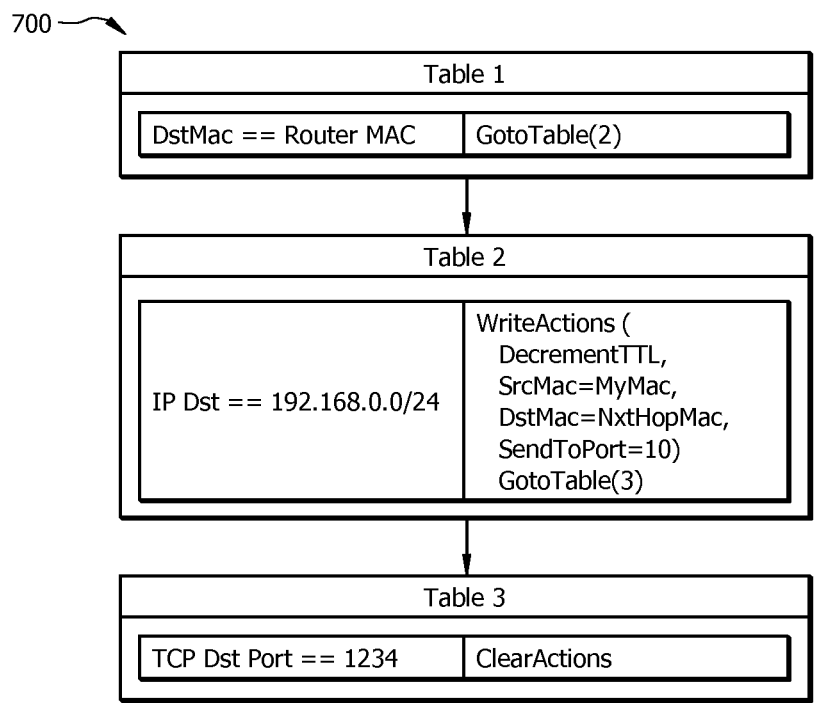
FIG. 7 is a schematic diagram of an embodiment of a flow pipeline for implementing a firewall.
Figure 8:
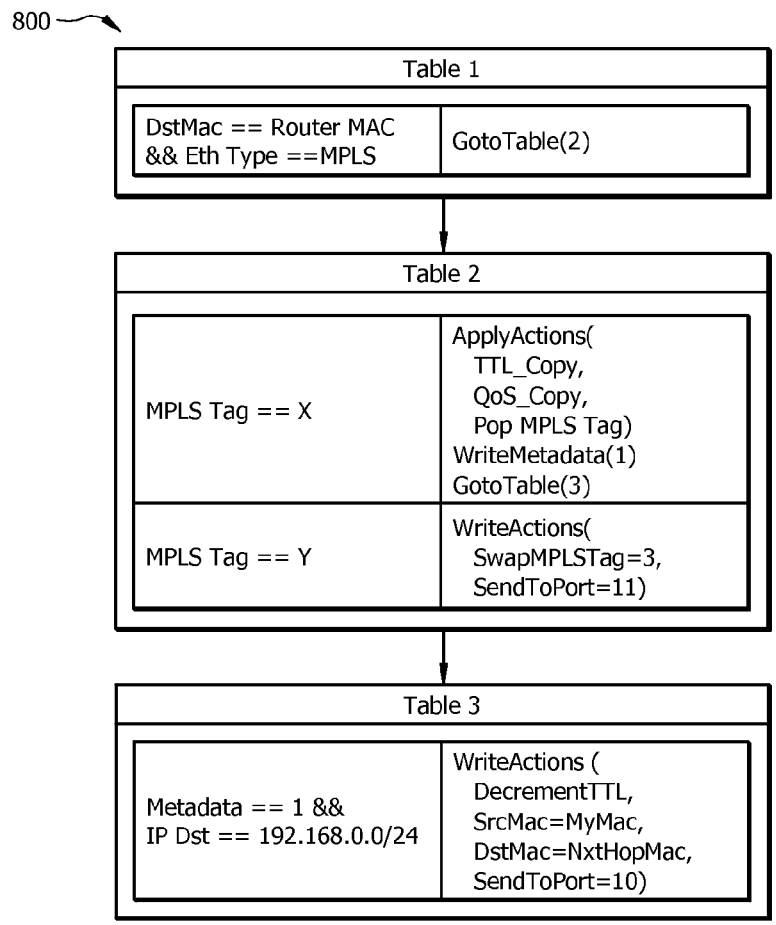
FIG. 8 is a schematic diagram of an embodiment of a flow pipeline for implementing multiprotocol label switching (MPLS).

FIGS. 4 and 5 are schematic diagrams of embodiments of flow pipelines for implementing QoS. FIGS. 6-8 are schematic diagrams of embodiments of flow pipelines for implementing VRF, a firewall, and MPLS, respectively. The flow pipelines in FIGS. 4-8 have been designed with multiple flow tables, but those flow pipelines are designed for single network services.

As discussed above, a flow pipeline may be designed for providing multiple network services by first selecting key network services that are most frequently used. Those network services may include ACL, layer two forwarding, VLAN, MPLS, and layer three forwarding. Second, key match fields corresponding to those services may be selected. Those match fields may be as shown in Table 1.

TABLE 1

Key Match Fields

| ACL | Layer Two Forwarding |
|---|---|
| ETH TYPE | ETH SRC |
| IP SRC | ETH DST |
| IP DST | Metadata |
| IP PROTO | |
| DST PORT | |

| VLAN | MPLS | Layer Three Forwarding |
|---|---|---|
| ETH DST | MPLS LABEL | IP SRC |
| VLAN VID | MPLS TC | IP DST |
| VLAN PCP | Metadata | ETH TYPE |
| Metadata | | IP TOS |
| | | IP PROTO |
| | | Metadata |

Figure 9:
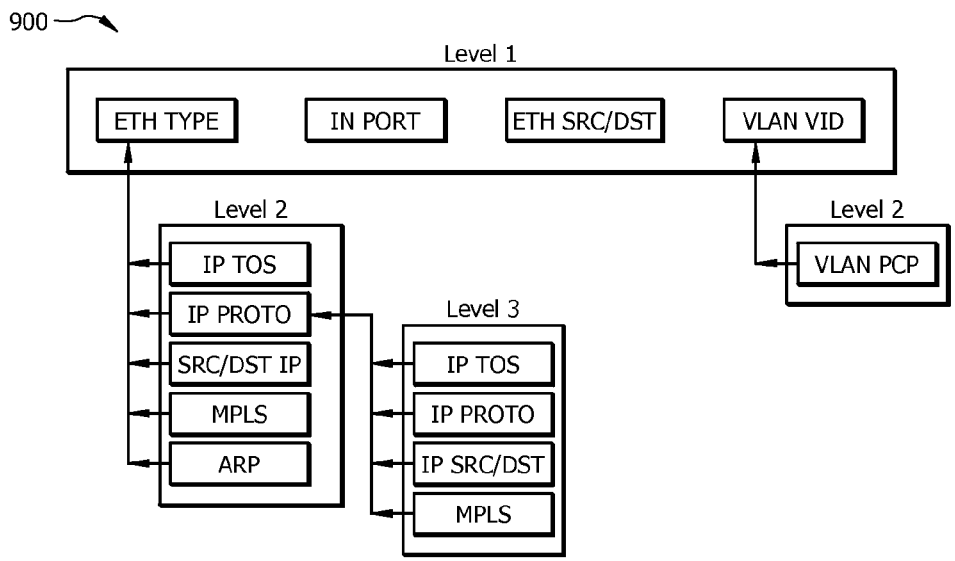
FIG. 9 is a diagram of match field shared dependencies.

In addition, ETH TYPE and IN PORT match fields may be used for locating different service types in order to accelerate packet forwarding. Third, some match fields may require that another match field also be used. Those requirements may be called shared dependencies and are shown in FIG. 9, which is a diagram of match field shared dependencies. As an example, as shown in Table 1, ACL has an IP PROTO match field. As shown in FIG. 9, in order to match IP PROTO, ETH TYPE must also be matched. Returning to Table 1, ETH TYPE is another match field for ACL, so the match field dependency in Table 1 is satisfied. Fourth, based on a prioritization of the network services, a determination of which match fields the network services have in common, and the match field shared dependencies, an optimized flow pipeline may be designed.

The prioritization may be based on which network services are most frequently used. A controller such as the controller 110, a network node such as the node 140, an administrator such as an administrator associated with the node 110, or another suitable entity may perform the prioritization. The controller, network node, or other suitable entity may analyze data traffic, determine which network services are most frequently used, and prioritize the network services accordingly. For example, if there are 10 available network services, the controller, network node, or other suitable entity may analyze data traffic, determine the top five available network services in terms of frequency of use, and select those top five available network services. The controller, network node, or other suitable entity may then prioritize the five available network services by frequency of use. Alternatively, the administrator may select and prioritize network services arbitrarily, based on his knowledge, or based on at least one criterion known to him.

In Table 1, the ETH TYPE match field may describe an Ethernet frame type. The IP SRC match field may correspond to either the IPV4 SRC match field, which may describe an IPv4 source address, or the IPV6 SRC match field, which may describe an IPv6 source address. The IP DST match field may correspond to either the IPV4 DST match field, which may describe an IPv4 destination address, or the IPV6 DST match field, which may describe an IPV6 destination address. The IP PROTO match field may describe an IPv4 or IPv6 protocol number. The DST PORT match field may correspond to either the TCP DST match field, which may describe the transmission control protocol (TCP) destination port, or the UDP DST match field, which may describe the user datagram protocol (UDP) destination port. The ETH SRC match field may describe an Ethernet source address. The ETH DST match field may describe an Ethernet destination address. The Metadata match field may describe metadata, which is defined above. The VLAN VID match field may describe the VLAN identification (ID). The VLAN PCP match field may describe a VLAN priority. The MPLS LABEL match field may describe an MPLS label. The MPLS TC match field may describe an MPLS traffic class (TC). The IP TOS match field my correspond to either the IP DSCP match field, which may describe an IP type of service (TOS) in six bits, or the IP ECN match field, which may describe an IP TOS in two bits. Finally, the IN PORT match field may describe a switch input port.

It is important to note that, though not shown, the disclosed match fields may comprise prefixes and other notations such as those shown on page 49 of OpenFlow 1.3.1. For example, the ETH TYPE match field may be described in OpenFlow 1.3.1 as OFPXMT_OFB_ETH_TYPE. While the match field nomenclature may change across different versions of OpenFlow, the purposes of the match fields generally remain the same.

Figure 10:
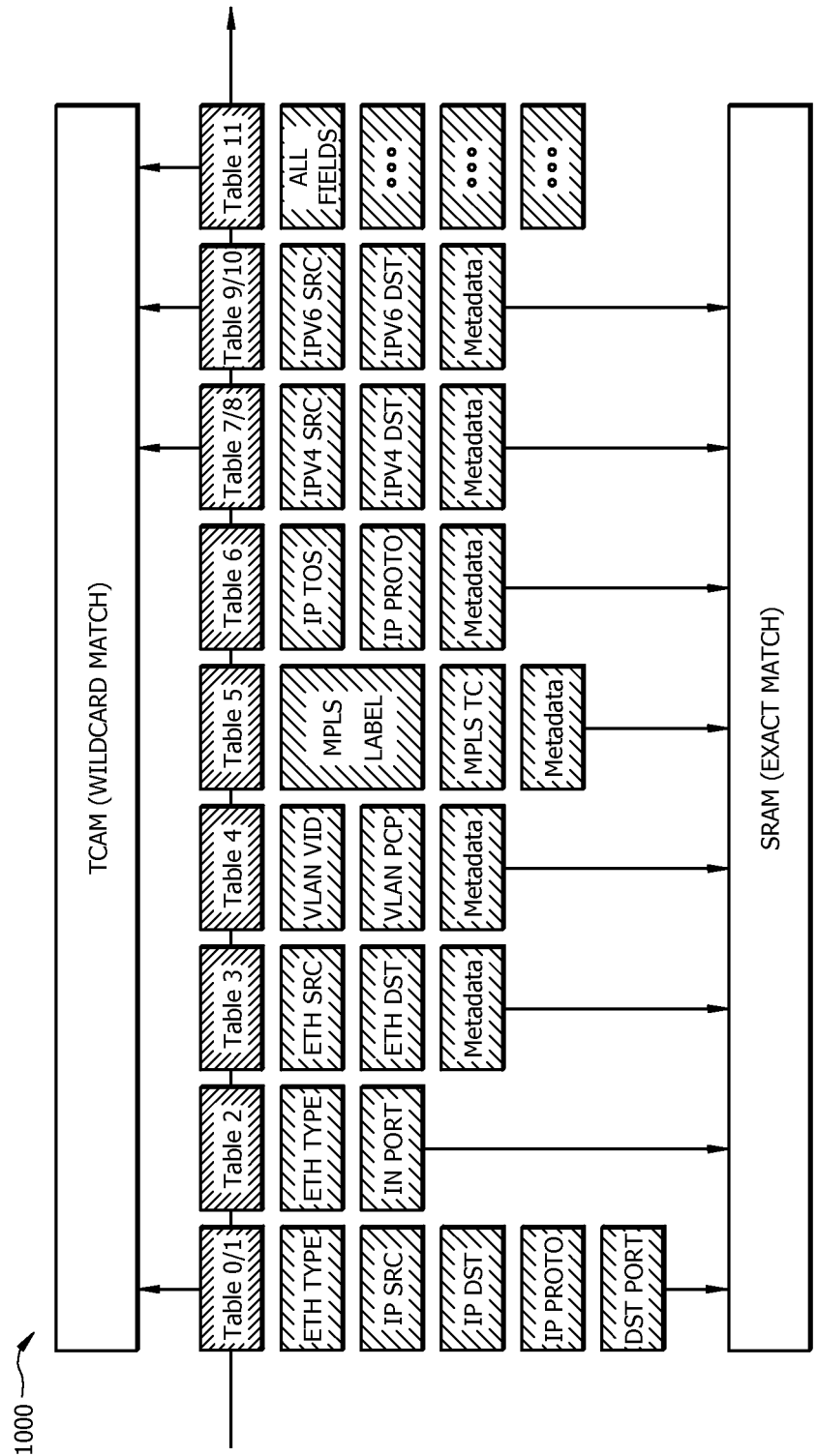
FIG. 10 is a schematic diagram of a flow pipeline according to an embodiment of the disclosure.

FIG. 10 is a schematic diagram of a flow pipeline 1000 according to an embodiment of the disclosure. The flow pipeline 1000 may be designed based on the above technique and may be implemented in the node 140 and, in particular, the FPM 150. Tables 0/1 may implement ACL; table 2 may implement service location; table 3 may implement layer two forwarding; tables 2-4 may implement VLAN; tables 2 and 5 may implement MPLS; tables 2, 6, and 7/8 may implement IPv4 (layer three) forwarding; tables 2, 6, and 9/10 may implement IPv6 (layer three) forwarding; and table 11 may include all remaining match fields in order to implement any remaining services. The denotation of tables 0/1 may indicate that table 0 and table 1 comprise the same match fields; however, table 0 may be an exact match table while table 1 may be a wildcard match table. The denotations of tables 7/8 and tables 9/10 may indicate the same exact match and wildcard match relationship. Each exact match table may be stored and searched on SRAM while each wildcard match table may be stored and searched on TCAM. This relationship may reduce the use of TCAM that would otherwise be needed to implement the flow pipeline 1000. In addition to having a 0 bit and a 1 bit to match or not match a field, TCAM may have a third do-not-care bit that may be well suited for wildcard matching. Exact matching and wildcard matching may occur sequentially or simultaneously. For example, table 0 may first perform matching and may be followed by table 1, or tables 0 and 1 may perform matching at the same time. If there is an exact match and a wildcard match, the exact match may take priority. The flow pipeline 1000 may support key network services, as well as fast switching and forwarding. For example, some services may not require matching each table, but may skip tables in the flow pipeline 1000. The subsequent figures provide such examples. In addition, group tables may be associated. Group tables may comprise sets of actions for flooding, may allow more complex forwarding, and may enable multiple flow entries to forward to a single identifier. Finally, the flow pipeline 1000 may be dynamically extended to other less frequently used match fields and provide support for future flow entries using table 11.

Figure 11:
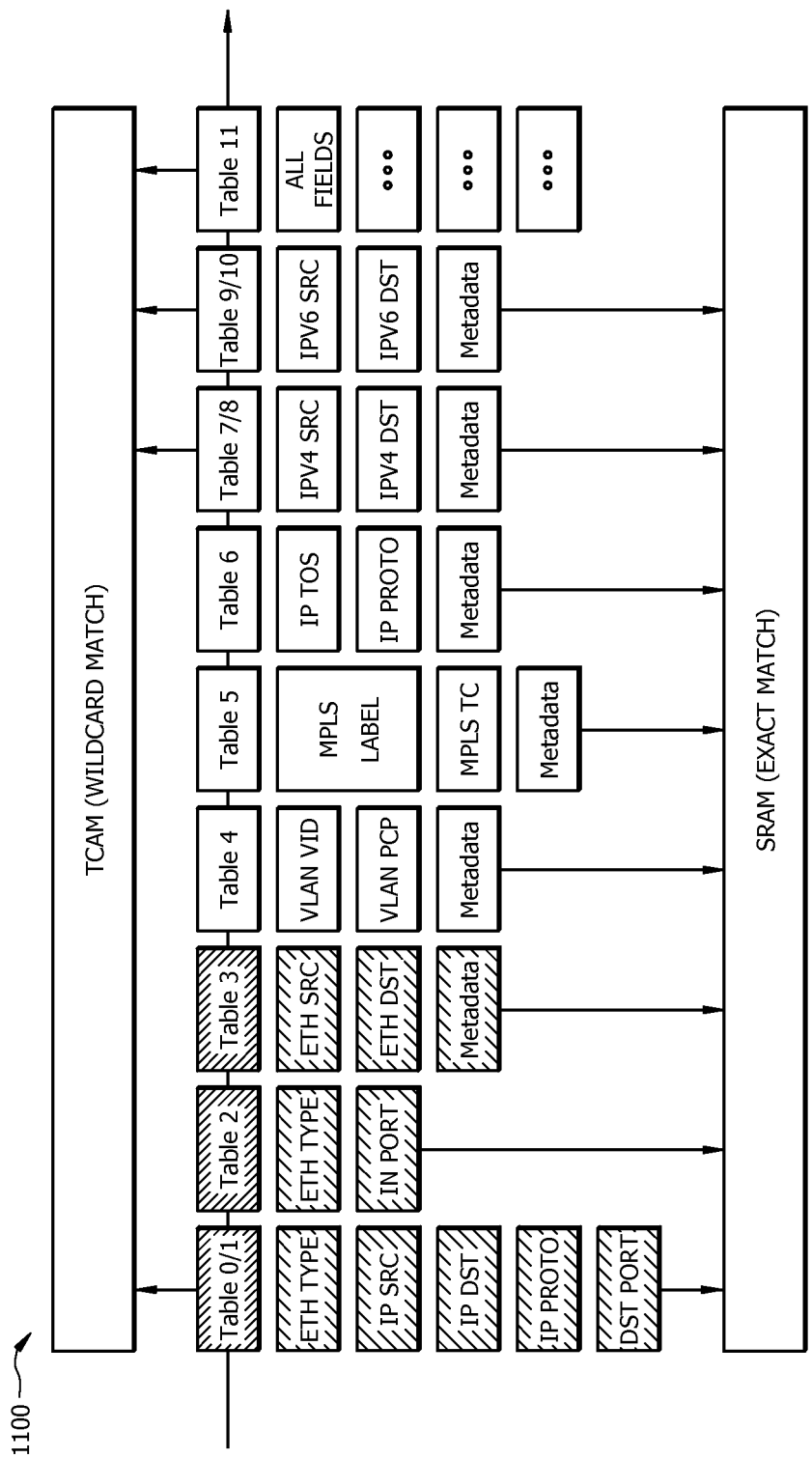
FIG. 11 is a schematic diagram demonstrating layer two switching and forwarding in the flow pipeline of FIG. 10.

FIG. 11 is a schematic diagram demonstrating layer two switching and forwarding in the flow pipeline 1000 of FIG. 10. A packet may start at tables 0/1 for ACL matching. If the packet is matched, then the packet may be instructed to jump to table 2. If the packet is not matched, then the packet may be sent to the controller 110, dropped, or forwarded according to a table-miss instruction. At table 2, if the packet is matched, then the packet may be instructed to jump to table 3. If the packet is not matched, then the packet may be forwarded to table 3 according to a table-miss instruction. At table 3, if the packet is matched, then the packet may be instructed to jump to the corresponding port of the node 140 and the data forwarding process may begin. If the packet is not matched, then the packet may be sent to the controller 110 or dropped.

Figure 12:
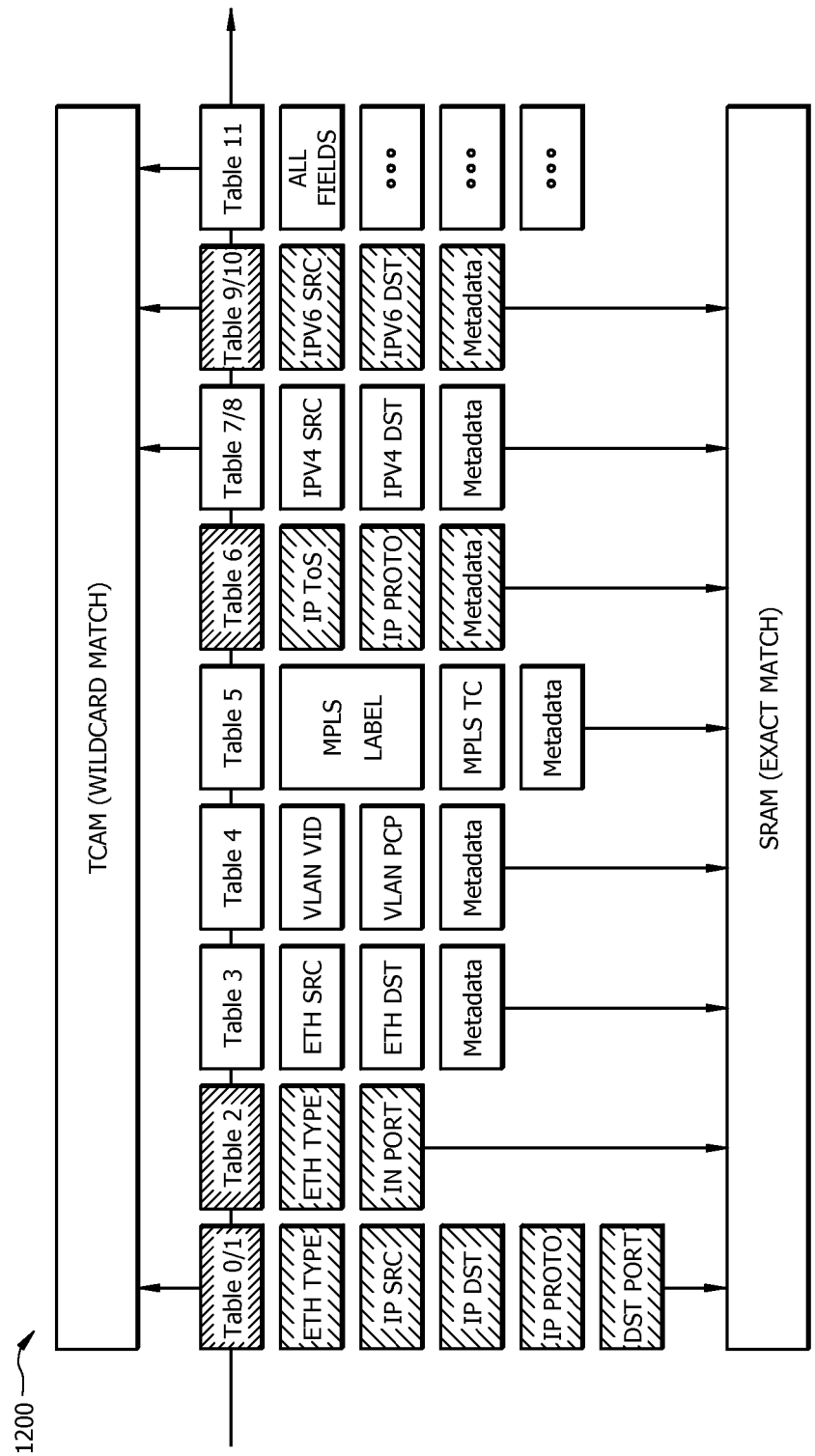
FIG. 12 is a schematic diagram demonstrating layer three switching and forwarding in the flow pipeline of FIG. 10.

FIG. 12 is a schematic diagram demonstrating layer 3 switching and forwarding in the flow pipeline 1000 of FIG. 10. A packet may start at tables 0/1 for ACL matching. If the packet is matched, then the packet may be instructed to jump to table 2. If the packet is not matched, then the packet may be sent to the controller 110, dropped, or forwarded according to a table-miss instruction. At table 2, if the packet is matched, then the packet may be instructed to jump to table 6. For example, if the packet has ETH TYPE =0x0806 and IN PORT =10, then the packet may be instructed to jump to table 6. If the packet is not matched, then the packet may be sent to the controller 110, dropped, or forwarded according to a table-miss instruction. At table 6, it can be determined what type of layer three forwarding may be appropriate. If the packet matches IPv4, then the packet may be instructed to jump to tables 7/8. If the packet matches IPv6, then the packet may be instructed to jump to tables 9/10. If the packet is not matched, then the packet may be sent to the controller 110 or dropped. At tables 9/10, if the packet is matched, then the packet may be instructed to jump to the corresponding port of the node 140 and the data forwarding process may begin. If the packet is not matched, then the packet may be sent to the controller 110 or dropped.

Based on the definition of the multiple flow tables, tables 0 and 1 could be extended according to some specific requirements. One such extension focusing on layer three forwarding may comprise the match fields shown in Table 2 and implemented in FIG. 13.

TABLE 2

Extended Flow Table Design

| Table 0: | Table 1: | Table 2: |
|---|---|---|
| ETH TYPE<br>IP PROTO<br>(Exact Match) | IPV4 SRC<br>IPV4 DST<br>TCP SRC<br>TCP DST<br>(Exact Match) | IPV4 SRC<br>IPV4 DST<br>TCP SRC<br>TCP DST<br>(Wildcard Match) |
| Table 3: | Table 4: | Table 5: |
| IPV4 SRC<br>IPV4 DST<br>UDP SRC<br>UDP DST<br>(Exact Match) | IPV4 SRC<br>IPV4 DST<br>UDP SRC<br>UDP DST<br>(Wildcard Match) | IPV6 SRC<br>IPV6 DST<br>TCP SRC<br>TCP DST<br>(Exact Match) |
| Table 6: | Table 7: | Table 8: |
| IPV6 SRC<br>IPV6 DST<br>TCP SRC<br>TCP DST<br>(Wildcard Match) | IPV6 SRC<br>IPV6 DST<br>UDP SRC<br>UDP DST<br>(Exact Match) | IPV6 SRC<br>IPV6 DST<br>UDP SRC<br>UDP DST<br>(Wildcard Match) |

Figure 13:
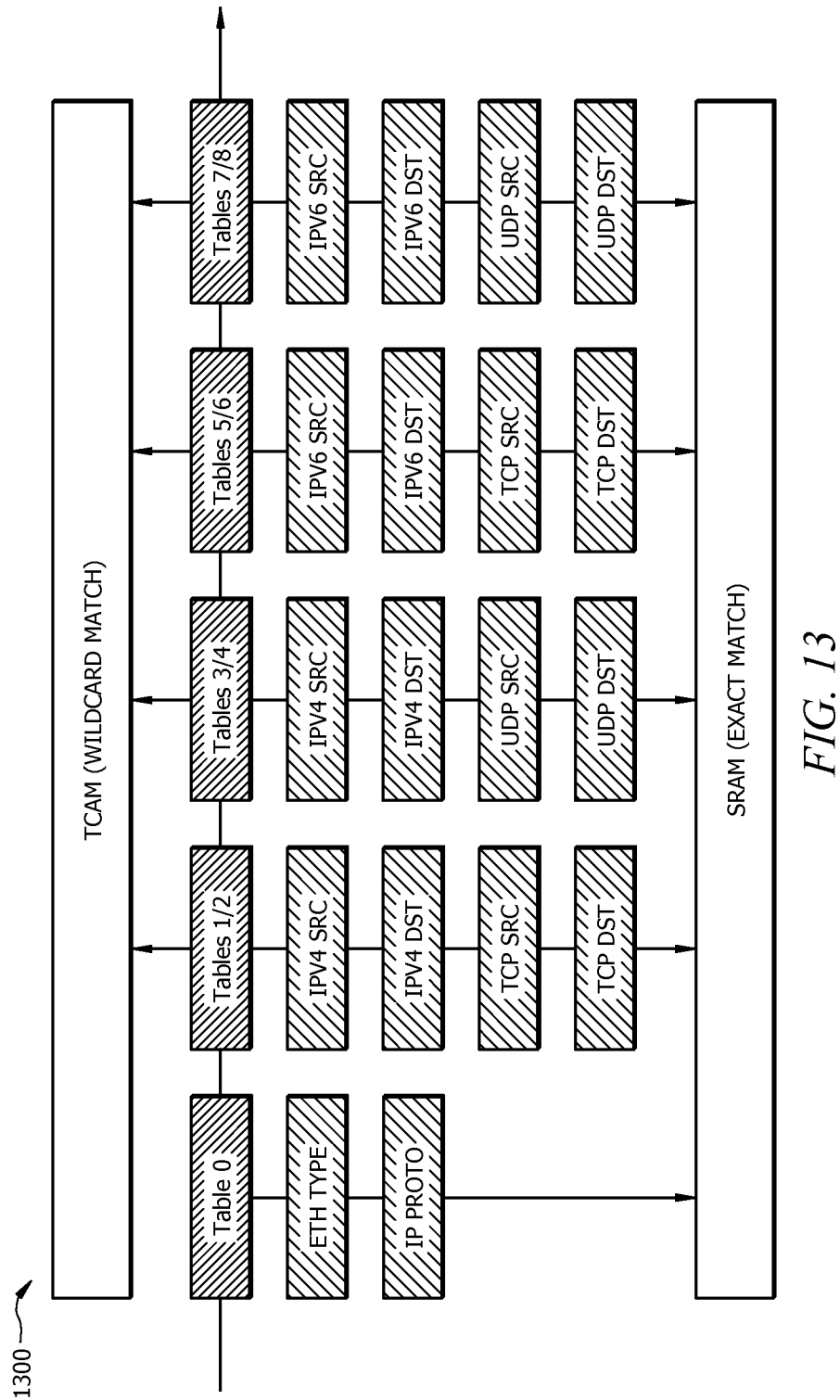
FIG. 13 is a schematic diagram of a flow pipeline according to another embodiment of the disclosure.

Like for FIGS. 10-12, the denotation in FIG. 13 of tables 1/2, 3/4, 5/6, and 7/8 may indicate that tables 1, 3, 5, and 7 may be exact match tables while tables 2, 4, 6, and 8 may be wildcard match tables.

In Table 2, the match field descriptions for Table 1 may still apply. In addition, the TCP SRC match field may describe the TCP source port. The UDP SRC match field may describe the UDP source port.

Figure 14:
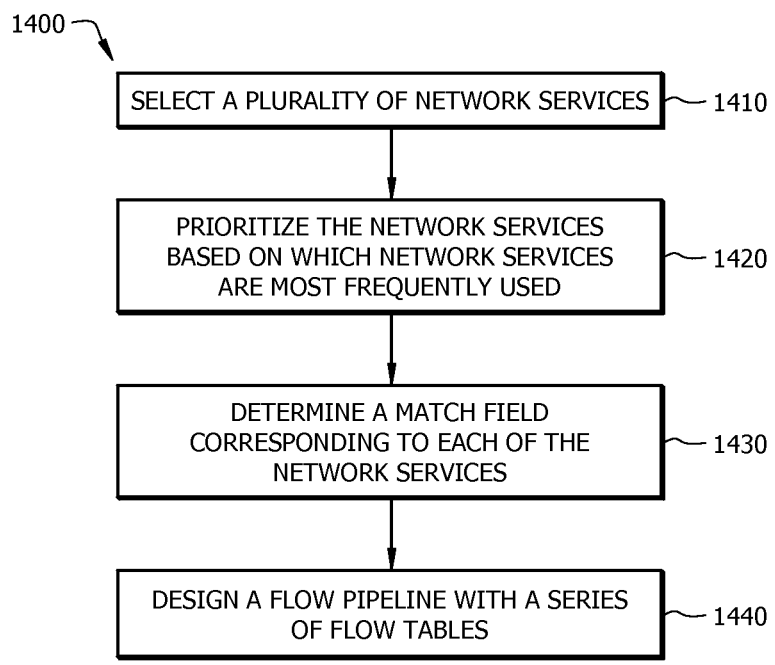
FIG. 14 is a flowchart illustrating a method according to an embodiment of the disclosure.

FIG. 14 is a flowchart illustrating a method 1400 according to an embodiment of the disclosure. The method 1400 may be implemented in the node 140, for example, in the FPM 150. At step 1410, a plurality of network services may be selected. At step 1420, the network services may be prioritized based on which network services are most important and which network services are most frequently used. At step 1430, a match field corresponding to each of the network services may be determined. At step 1440, a flow pipeline with a series of flow tables may be designed. Each of the flow tables may comprise at least one of the match fields, and the match fields may be ordered based on the prioritization, which of the match fields are shared among the network services, a shared dependency of the match fields, and processing speed.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising: a receiver configured to receive instructions;
    a memory system coupled to the receiver and configured to store the instructions; and a processor coupled to the memory system and configured to execute the instructions to cause the apparatus to:
    implement a flow pipeline, wherein the flow pipeline is a set of flow tables, wherein the flow tables are routing tables used to perform packet flow and comprise match fields, wherein the match fields are fields against which packets are matched, and wherein the match fields are ordered for routing based on a prioritization of which network services are most frequently used, which match fields the network services have in common, and match field shared dependencies, and
    route a packet using the flow pipeline and based on which network services are most frequently used,
    wherein the network services comprise an access control list (ACL) service, a layer two forwarding service, a virtual local area network (VLAN) service, a multiprotocol label switching (MPLS) service, a layer three forwarding service, and a service locating service.

2. The apparatus of claim 1, wherein the layer three forwarding service comprises an Internet Protocol version 4 (IPv4) service and an Internet Protocol version 6 (IPv6) service.

3. The apparatus of claim 2, wherein the flow tables are numbered 0 to 11, wherein flow table 0 and flow table 1 cause the processor to implement the ACL service, wherein flow table 2 causes the processor to implement the service locating service, wherein flow table 3 causes the processor to implement the layer two forwarding service, wherein flow table 2, flow table 3, and flow table 4 cause the processor to implement the VLAN service, wherein flow table 2 and flow table 5 cause the processor to implement the MPLS service, wherein flow table 2, flow table 6, flow table 7, and flow table 8 cause the processor to implement the IPv4 service, wherein flow table 2, flow table 6, flow table 9, and flow table 10 cause the processor to implement the IPv6 service, and wherein flow table 11 causes the processor to implement at least one additional service.

4. The apparatus of claim 3, wherein table 0, table 7, and table 9 are exact match tables, and wherein table 1, table 8, and table 10 are wildcard match tables.

5. The apparatus of claim 3, wherein flow table 0 and flow table 1 each comprise ETH TYPE, IP SRC, IP DST, IP PROTO, and DST PORT match fields, wherein flow table 2 comprises ETH TYPE and IN PORT match fields, wherein flow table 3 comprises ETH SRC, ETH DST, and Metadata match fields, wherein flow table 4 comprises VLAN VID, VLAN PCP, and Metadata match fields, wherein flow table 5 comprises MPLS LABEL, MPLS TC, and Metadata match fields, wherein flow table 6 comprises IP TOS, IP PROTO, and Metadata match fields, wherein flow table 7 and flow table 8 each comprise IPV4 SRC, IPV4 DST, and Metadata match fields, wherein flow table 9 and flow table 10 each comprise IPV6 SRC, IPV6 DST, and Metadata match fields, wherein flow table 11 comprises additional match fields, and wherein the ETH TYPE match field describes an Ethernet frame type, the IP SRC match field describes an Internet Protocol (IP) source address, the IP DST match field describes an IP destination address, the IP PROTO match field describes an IPv4 or IPv6 protocol number, the DST PORT match field describes a destination port, the IN PORT match field describes a switch input port, the ETH SRC match field describes an Ethernet source address, the ETH DST match field describes an Ethernet destination address, the Metadata match field describes metadata, the VLAN VID match field describes a VLAN identification (ID), the VLAN PCP match field describes a VLAN priority, the MPLS LABEL match field describes an MPLS label, the MPLS TC match field describes an MPLS traffic class (TC), the IP TOS match field describes an IP type of service (TOS), the IPV4 SRC match field describes an IPv4 source address, the IPV4 DST match field describes an IPv4 destination address, the IPV6 SRC match field describes an IPv6 source address, and the IPV6 DST match field describes an IPV6 destination address.

6. The apparatus of claim 5, wherein the additional match fields comprise all remaining match fields.

7. The apparatus of claim 1, wherein the memory system comprises static random-access memory (SRAM) for implementing exact matching of the match fields and ternary content-addressable memory (TCAM) for implementing wildcard matching of the match fields.

8. The apparatus of claim 1, wherein the flow tables are numbered 0 to 8, wherein flow table 0 comprises ETH TYPE and IP PROTO match fields, wherein flow table 1 and flow table 2 each comprise IPV4 SRC, IPV4 DST, TCP SRC, and TCP DST match fields, wherein flow table 3 and flow table 4 each comprise IPV4 SRC, IPV4 DST, UDP SRC, and UDP DST match fields, wherein flow table 5 and flow table 6 each comprise IPV6 SRC, IPV6 DST, TCP SRC, and TCP DST match fields, wherein flow table 7 and flow table 8 each comprise IPV6 SRC, IPV6 DST, UDP SRC, and UDP DST match fields, and wherein the ETH TYPE match field describes an Ethernet frame type, the IP PROTO match field describes an IPV4 DST match field describes an IPv4 destination address, the TCP SRC match field describes a transmission control protocol (TCP) source port, the TCP DST match field describes a TCP destination port, the UDP SRC match field describes a user datagram protocol (UDP) source port, the UDP DST match field describes a UDP destination port, the IPV6 SRC match field describes an IPv6 source address, and the IPV6 DST match field describes an IPv6 destination address.

9. The apparatus of claim 8, wherein flow table 0, flow table 1, flow table 3, flow table 5, and flow table 7 are exact match flow tables, and wherein flow table 2, flow table 4, flow table 6, and flow table 8 are wildcard match flow tables.

10. The apparatus of claim 1, wherein the network services are independent of content in packets.

11. An apparatus comprising:
a first processor configured to create instructions for implementing a flow pipeline so that the flow pipeline is a set of flow tables, wherein the flow tables are routing tables used to perform packet flow and comprise match fields, wherein the match fields are fields against which packets are matched, wherein the match fields are ordered for routing based on a prioritization of which network services are most frequently used, which match fields the network services have in common, and match field shared dependencies, and wherein the instructions instruct routing using the flow pipeline and based on which network services are most frequently used;
a memory coupled to the first processor and configured to store the instructions; and a transmitter coupled to the memory and configured to transmit the instructions,
wherein the network services comprise an access control list (ACL) service, a layer two forwarding service, a virtual local area network (VLAN) service, a multiprotocol label switching (MPLS) service, a layer three forwarding service, and a service locating service.

12. The apparatus of claim 11, wherein the layer three forwarding service comprises an Internet Protocol version 4 (IPv4) service and an Internet Protocol version 6 (IPv6) service.

13. The apparatus of claim 12, wherein the flow tables are numbered 0 to 11, wherein flow table 0 and flow table 1 cause a second processor to implement the ACL service, wherein flow table 2 causes the second processor to implement the service locating service, wherein flow table 3 causes the second processor to implement the layer two forwarding service, wherein flow table 2, flow table 3, and flow table 4 cause the second processor to implement the VLAN service, wherein flow table 2 and flow table 5 cause the second processor to implement the MPLS service, wherein flow table 2, flow table 6, flow table 7, and flow table 8 cause the second processor to implement the IPv4 service, wherein flow table 2, flow table 6, flow table 9, and flow table 10 cause the second processor to implement the IPv6 service, and wherein flow table 11 causes the second processor to implement at least one additional service.

14. A method related to software-defined networking (SDN) OpenFlow, the method comprising: selecting network services; prioritizing the network services based on which network services are most frequently used; determining match fields corresponding to the network services, wherein the match fields are fields against which packets are matched:
designing a flow pipeline as a set of flow tables, wherein the flow tables are routing tables used to perform packet flow, wherein each of the flow tables comprises at least one of the match fields, and wherein the match fields are ordered for routing based on the prioritizing, which match fields the network services have in common, and match field shared dependencies; and
instructing routing using the flow pipeline and based on which network services are most frequently used,
wherein the network services comprise an access control list (ACL) service, a layer two forwarding service, a virtual local area network (VLAN) service, a multiprotocol label switching (MPLS) service, a layer three forwarding service, and a service locating service.

15. The method of claim 14, further comprising sending instructions to implement the flow pipeline and to route packets using the flow pipeline.

16. The method of claim 14, wherein the network services are independent of content in packets.

17. The method of claim 14, wherein the flow tables are numbered 0 to 11, wherein flow table 0 and flow table 1 implement the ACL service, wherein flow table 2 implements the service locating service, wherein flow table 3 implements the layer two forwarding service, and wherein flow table 2, flow table 3, and flow table 4 implement the VLAN service, wherein flow table 2 and flow table 5 implement the MPLS service, wherein flow table 2, flow table 6, flow table 7, and flow table 8 implement an Internet Protocol version 4 (IPv4) service, wherein flow table 2, flow table 6, flow table 9, and flow table 10 implement an Internet Protocol version 6 (IPv6) service, and wherein flow table 11 implements at least one additional service.

18. The method of claim 17, wherein flow table 0 and flow table 1 each comprise ETH TYPE, IP SRC, IP DST, IP PROTO, and DST PORT match fields, wherein flow table 2 comprises ETH TYPE and IN PORT match fields, wherein flow table 3 comprises ETH SRC, ETH DST, and Metadata match fields, wherein flow table 4 comprises VLAN VID, VLAN PCP, and Metadata match fields, wherein flow table 5 comprises MPLS LABEL, MPLS TC, and Metadata match fields, wherein flow table 6 comprises IP TOS, IP PROTO, and Metadata match fields, wherein flow table 7 and flow table 8 each comprise IPV4 SRC, IPV4 DST, and Metadata match fields, wherein flow table 9 and flow table 10 each comprise IPV6 SRC, IPV6 DST, and Metadata match fields, wherein flow table 11 comprises additional match fields, and wherein the ETH TYPE match field describes an Ethernet frame type, the IP SRC match field describes an Internet Protocol (IP) source address, the IP DST match field describes an IP destination address, the IP PROTO match field describes an IPv4 or IPv6 protocol number, the DST PORT match field describes a destination port, the IN PORT match field describes a switch input port, the ETH SRC match field describes an Ethernet source address, the ETH DST match field describes an Ethernet destination address, the Metadata match field describes metadata, the VLAN VID match field describes a VLAN identification (ID), the VLAN PCP match field describes a VLAN priority, the MPLS LABEL match field describes an MPLS label, the MPLS TC match field describes an MPLS traffic class (TC), the IP TOS match field describes an IP type of service (TOS), the IPV4 SRC match field describes an IPv4 source address, the IPV4 DST match field describes an IPv4 destination address, the IPV6 SRC match field describes an IPv6 source address, and the IPV6 DST match field describes an IPV6 destination address.

* * * * *

UNITED STATES PATENT AND TRADEMARK OFFICE
CERTIFICATE OF CORRECTION

PATENT NO.        : 9,923,831 B2
APPLICATION NO.   : 14/089295
DATED             : March 20, 2018
INVENTOR(S)       : Jiao Wang et al.

Page 1 of 1

It is certified that error appears in the above-identified patent and that said Letters Patent is hereby corrected as shown below:

On the Title Page

Page 2, References Cited, Foreign Patent Documents:
Delete "WO 2012032864 A1 3/2013"

In the Claims

Column 11, Lines 45-65, Claim 8 should read:
8. The apparatus of claim 1, wherein the flow tables are numbered 0 to 8, wherein flow table 0 comprises ETH TYPE and IP PROTO match fields, wherein flow table 1 and flow table 2 each comprise IPV4 SRC, IPV4 DST, TCP SRC, and TCP DST match fields, wherein flow table 3 and flow table 4 each comprise IPV4 SRC, IPV4 DST, UDP SRC, and UDP DST match fields, wherein flow table 5 and flow table 6 each comprise IPV6 SRC, IPV6 DST, TCP SRC, and TCP DST match fields, wherein flow table 7 and flow table 8 each comprise IPV6 SRC, IPV6 DST, UDP SRC, and UDP DST match fields, and wherein the ETH TYPE match field describes an Ethernet frame type, the IP PROTO match field describes an IPv4 or IPv6 protocol number, the IPV4 SRC match field describes an IPv4 source address, the IPV4 DST match field describes an IPv4 destination address, the TCP SRC match field describes a transmission control protocol (TCP) source port, the TCP DST match field describes a TCP destination port, the UDP SRC match field describes a user datagram protocol (UDP) source port, the UDP DST match field describes a UDP destination port, the IPV6 SRC match field describes an IPv6 source address, and the IPV6 DST match field describes an IPv6 destination address.

Signed and Sealed this
Tenth Day of July, 2018

Andrei Iancu
*Director of the United States Patent and Trademark Office*